United States Patent
Baek et al.

(10) Patent No.: US 10,234,999 B2
(45) Date of Patent: Mar. 19, 2019

(54) APPARATUS FOR SENSING TOUCH PRESSURE

(71) Applicant: Samsung Display Co., Ltd., Yongin-si, Gyeonggi-do (KR)

(72) Inventors: Ji Yeon Baek, Yongin-si (KR); Ji Yun Bang, Yongin-si (KR); Seung Min Lee, Yongin-si (KR); Jang Hwang Jeon, Yongin-si (KR); Chang Sub Jung, Yongin-si (KR)

(73) Assignee: Samsung Display Co., Ltd. (KR)

( * ) Notice: Subject to any disclaimer, the term of this patent is extended or adjusted under 35 U.S.C. 154(b) by 31 days.

(21) Appl. No.: 15/667,416

(22) Filed: Aug. 2, 2017

(65) Prior Publication Data

US 2018/0039357 A1 Feb. 8, 2018

(30) Foreign Application Priority Data

Aug. 4, 2016 (KR) .................. 10-2016-0099643

(51) Int. Cl.
*G06F 3/044* (2006.01)

(52) U.S. Cl.
CPC .... *G06F 3/044* (2013.01); *G06F 2203/04105* (2013.01); *G06F 2203/04112* (2013.01)

(58) Field of Classification Search
CPC ............ G06F 3/041–3/047; G06F 2203/04105
USPC .................... 178/18.01–19.07; 345/173–178
See application file for complete search history.

(56) References Cited

U.S. PATENT DOCUMENTS

| | | | |
|---|---|---|---|
| 2016/0179229 A1* | 6/2016 | Ahn ...................... | G06F 3/041 345/173 |
| 2017/0010728 A1* | 1/2017 | Kurasawa ............. | G06F 3/0414 |
| 2017/0192596 A1* | 7/2017 | Lee ..................... | G02F 1/13306 |
| 2017/0357354 A1* | 12/2017 | Lim ..................... | G06F 3/0412 |
| 2018/0088700 A1* | 3/2018 | Cao ..................... | G06F 3/0414 |
| 2018/0095582 A1* | 4/2018 | Hwang ................ | G06F 3/0412 |
| 2018/0113542 A1* | 4/2018 | Cao ..................... | G06F 3/0412 |
| 2018/0246610 A1* | 8/2018 | Yang .................... | G06F 3/0412 |

FOREIGN PATENT DOCUMENTS

KR 10-1613081 B1 4/2016

* cited by examiner

*Primary Examiner* — Michael Pervan
(74) *Attorney, Agent, or Firm* — Innovation Counsel LLP

(57) ABSTRACT

An apparatus for sensing a touch pressure includes: a substrate; a touch sensor provided on one surface of the substrate; a first pressure sensing electrode provided on the other surface opposite to the one surface of the substrate; a protective layer provided on the first pressure sensing electrode, the protective layer including a first opening area through which a portion of the first pressure sensing electrode is exposed; a flexible circuit board electrically connecting the touch sensor and the first pressure sensing electrode to each other; and a conductive member disposed in the first opening area, the conductive member electrically connecting the first pressure sensing electrode and the flexible circuit board to each other.

20 Claims, 3 Drawing Sheets

APPARATUS FOR SENSING TOUCH PRESSURE

RELATED APPLICATIONS

The present application claims priority to Korean Patent Application No. 10-2016-0099643, filed on Aug. 4, 2016, in the Korean Intellectual Property Office, the entire disclosure of which is incorporated by reference herein.

BACKGROUND

1. Field

An aspect of the present disclosure relates to an apparatus for sensing a touch pressure.

2. Description of the Related Art

A touch sensing apparatus is an input apparatus that enables a command of a user to be input by selecting an instruction content displayed on a screen of a display panel or the like with a hand of the user or object. Since such a touch sensing apparatus can be substituted for input apparatus such as a keyboard or mouse, which is connected to a display device to be operated, its application fields have been gradually extended.

As the touch sensing apparatus is steadily developed, demand for applications using more delicate and various touch functions has increased. Therefore, the touch sensing apparatus may be provided with not only a function of sensing a touch position but also a function of sensing a touch pressure. Such a touch pressure sensing apparatus can sense a touch pressure.

SUMMARY

According to an aspect of the present disclosure, there is provided an apparatus for sensing a touch pressure, the apparatus including: a substrate; a touch sensor provided on one surface of the substrate; a first pressure sensing electrode provided on the other surface opposite to the one surface of the substrate; a protective layer provided on the first pressure sensing electrode, the protective layer including a first opening area through which a portion of the first pressure sensing electrode is exposed; a flexible circuit board electrically connecting the touch sensor and the first pressure sensing electrode to each other; and a conductive member disposed in the first opening area, the conductive member electrically connecting the first pressure sensing electrode and the flexible circuit board to each other.

The conductive member may have a structure in which a conductive fabric is located between a first conductive adhesive layer and a second conductive adhesive layer.

Each of the first and second conductive adhesive layers may have a structure in which metal conductive balls are mixed in a polymer adhesive.

A thickness of the conductive member may be thicker than that of the protective layer.

The first pressure sensing electrode may be formed through a screen printing technique using a silver paste.

The apparatus may further include a second pressure sensing electrode disposed to be spaced apart from the first pressure sensing electrode, the second pressure sensing electrode forming a capacitance with the first pressure sensing electrode.

The second pressure sensing electrode may be grounded.

The second pressure sensing electrode may be a bottom chassis.

The apparatus may further include a touch controller calculating a magnitude of a touch pressure by sensing an electrical characteristic value of the first pressure sensing electrode.

The substrate may be an encapsulation substrate of a display panel. The touch sensor may be directly formed on the encapsulation substrate.

The substrate may be a pixel array substrate of a display panel. The touch sensor may be formed between an encapsulation substrate and the pixel array substrate of the display panel.

The substrate may be a base substrate of a touch screen panel.

The touch sensor may include a plurality of sensing electrodes for sensing a touch position.

One end portion of the flexible circuit board may be electrically connected to the touch sensor, and the other end portion of the flexible circuit board may be electrically connected to the first pressure sensing electrode through the conductive member.

The flexible circuit board may include a first protective layer, a second protective layer, and a conductive layer provided between the first protective layer and the second protective layer. The other end portion of the flexible circuit board, which corresponds to the first opening area, may have a second opening area formed by removing a portion of the first protective layer or the second protective layer to expose a portion of the conductive layer therethrough.

According to an aspect of the present disclosure, there is provided an display device for sensing a touch pressure, the display device including: a display panel including a pixel array substrate; a touch sensor disposed on one surface of the display panel; a first pressure sensing electrode provided on the other surface opposite to the one surface of the display panel; a protective layer provided on the first pressure sensing electrode, the protective layer including a contact hole through which a portion of the first pressure sensing electrode is exposed; a flexible circuit board electrically connecting the touch sensor and the first pressure sensing electrode; and a conductive member disposed in the contact hole, the conductive member electrically connecting the first pressure sensing electrode and the flexible circuit board.

The conductive member may include a first conductive adhesive layer, a second conductive adhesive layer and a conductive member disposed between the first conductive adhesive layer and the second conductive adhesive layer.

A thickness of the conductive member may be thicker than that of the protective layer.

The first conductive adhesive layer and the second conductive adhesive layer may include metal conductive balls mixed in a polymer adhesive.

The conductive member may include a conductive fabric.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an FIG. 1A is a plan view schematically illustrating an apparatus for sensing a touch pressure according to an embodiment of the present disclosure.

DETAILED DESCRIPTION

Figure 1A:
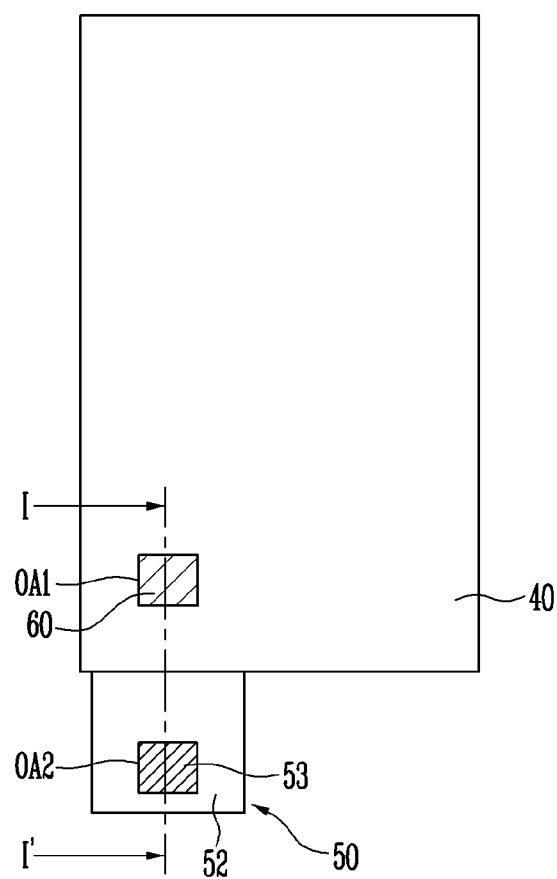
FIG. 1B is a partial sectional view of the apparatus taken along line I-I' of FIG. 1A.
FIG. 1C is an enlarged sectional view of a conductive member of FIG. 1B.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, exemplary embodiments of the present disclosure will be described in detail with reference to the accompanying drawings.

Figure 1B:
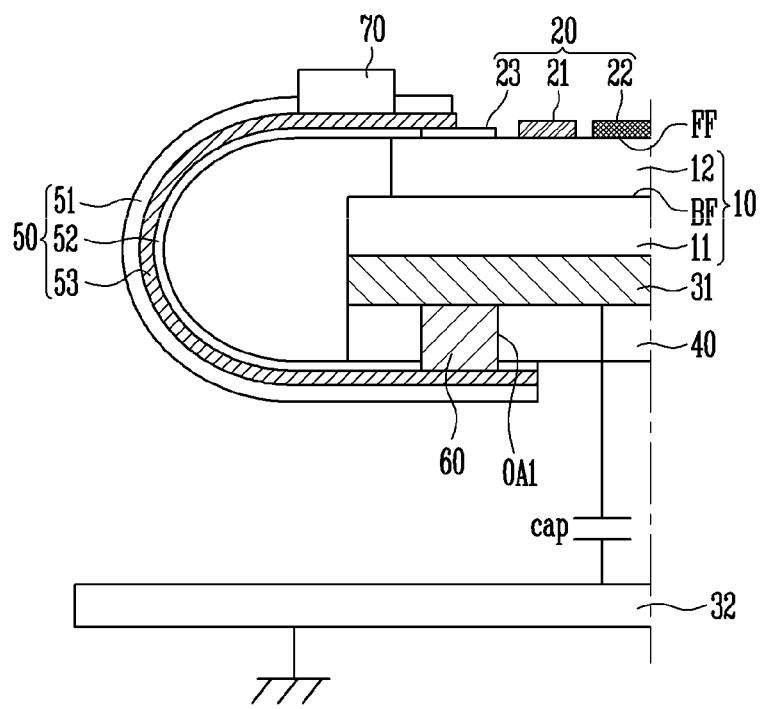
Figure 1C:
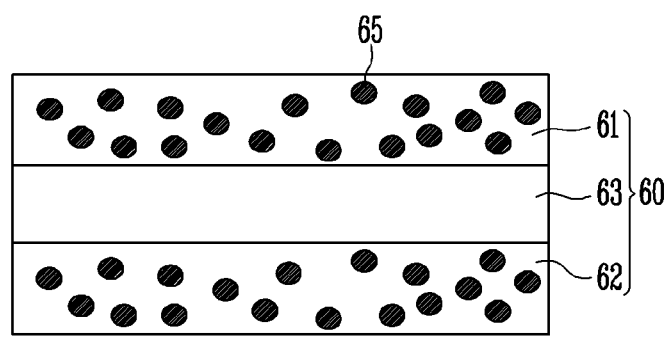

FIG. 1A is a plan view schematically illustrating an apparatus for sensing a touch pressure according to an embodiment of the present disclosure. FIG. 1B is a partial sectional view of the apparatus taken along line I-I' of FIG. 1A. FIG. 1C is an enlarged sectional view of a conductive member of FIG. 1B.

Here, FIG. 1A is a plan view when one surface of a protective layer 40 is viewed before a flexible circuit board 50 is bent, and FIG. 1B is a partial sectional view in a state in which the flexible circuit board 50 is bent to be in contact with the one surface of the protective layer 40.

Referring to FIGS. 1A, 1B, and 1C, the apparatus according to the embodiment of the present disclosure may include a display panel 10, a touch sensor 20, a first pressure sensing electrode 31, a second pressure sensing electrode 32, the protective layer 40, the flexible circuit board 50, a conductive member 60, and a touch controller 70.

The display panel 10 includes a pixel array substrate 11 on which a plurality of pixels (not shown) are formed and an encapsulation substrate 12 covering the pixel array substrate 11. The display panel 10 may be a flexible display panel having flexibility entirely or partially. In an embodiment, the display panel 10 may be an organic light emitting display panel, and various examples known in the art may be applied as the display panel 10.

The pixel array substrate 11 and the encapsulation substrate 12 may be made of an insulative material such as glass or resin. Also, the pixel array substrate 11 and the encapsulation substrate 12 may be made of a material having flexibility to be bendable or foldable, and have a single-layer structure or a multi-layer structure.

For example, the pixel array substrate 11 and the encapsulation substrate 12 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the pixel array substrate 11 and the encapsulation substrate 12 may be variously changed, and the pixel array substrate 11 and the encapsulation substrate 12 may be made of a fiber reinforced plastic (FRP), etc.

The touch sensor 20 may include a plurality of sensing electrodes for sensing a touch position. In this embodiment, the touch sensor 20 includes first sensing electrodes 21, second sensing electrodes 22, and a connection line 23. Also, the touch sensor 20 is directly formed on one surface FF of the encapsulation substrate 12.

The first and the second sensing electrodes 21 and 22 are a plurality of conductive patterns for sensing a touch input, and may be uniformly distributed and arranged in an active area. The first and second sensing electrodes 21 and 22 may be formed in the same plane or different planes. A mutual capacitance is formed between the first sensing electrodes 21 and the second sensing electrodes 22. When a touch event occurs, the mutual capacitance is changed. In another embodiment, the touch sensor 20 may be configured with sensing electrodes of a self-capacitance type.

The first and second sensing electrodes 21 and 22 may be provided in various shapes, e.g., a polygonal shape including a bar shape, a diamond shape, and the like, or a circular shape. Each of the first and second sensing electrodes 21 and 22 may be provided in a single layer or a multi-layer.

In order to prevent contact between the first sensing electrodes 21 and the second sensing electrodes 22, an insulating layer (not shown) may be formed between the first sensing electrodes 21 and the second sensing electrodes 22. The insulating layer may be entirely formed between the first sensing electrodes 21 and the second sensing electrodes 22, or be locally formed at intersection portions of the first sensing electrodes 21 and the second sensing electrodes 22.

The first sensing electrode 21 and the second sensing electrode d 22 may be formed of a transparent electrode material to enable light to be transmitted therethrough. In an embodiment, the first and second sensing electrodes 21 and 22 may be made of a transparent conductive material such as indium tin oxide (ITO), indium zinc oxide (IZO), or antimony zinc oxide (AZO).

In this embodiment, a case where the first and second sensing electrodes 21 and 22 are arranged in the same plane is illustrated as an example. However, the present disclosure is not limited thereto, and the arrangement of the first sensing electrode 21 and the second sensing electrode 22 may be selected from the shape, structure, and material of various conductive patterns known in the art.

For example, the first sensing electrode 21 and the second sensing electrode 22 may be provided in a mesh form having a structure in which a plurality of conductive lines intersect one another. In this case, the first sensing electrode 21 and the second sensing electrode 22 may be made of a conductive metallic material or a conductive nano compound such as a silver nano wire (AgNW), a carbon nano tube (CNT), or graphene.

One end of the connection line 23 may be connected to one of the first sensing electrodes 21 and the second sensing electrodes 22, and the other end of the connection line may have a pad (not shown) connected to an external circuit. In an embodiment, the connection line 23 may be provided in the same plane and the same material as the first sensing electrode 21 and the second sensing electrode 22.

A plurality of connection lines are disposed in a non-active area. Since the material of the connection lines is selected in a wide range, the connection lines may be formed of not only a transparent electrode material but also a low-resistance metallic material such as molybdenum (Mo), silver (Ag), titanium (Ti), copper (Cu), aluminum (Al), or any alloy thereof. In addition, the connection lines may be formed in a single layer or a multi-layer. In this case, the connection lines may include a multi-layer in which two or more of the metallic materials are stacked.

In this embodiment, the self-capacitance type touch sensor 20 is illustrated as an example, but a touch sensor of a different type may be employed. For example, the touch sensor 20 may be implemented in various types such as a resistive type, an infrared beam type, a surface acoustic wave type, an integral strain gauge type, and a piezo type.

The first pressure sensing electrode 31 and the second pressure sensing electrode 32 are structures for sensing a touch pressure. The first pressure sensing electrode 31 and the second pressure sensing electrode 32 may serve as a capacitor, and a predetermined capacitance cap may be formed between the first pressure sensing electrode 31 and the second pressure sensing electrode 32.

The capacitance cap between the first pressure sensing electrode 31 and the second pressure sensing electrode 32 may be changed depending on a distance at which the first pressure sensing electrode 31 and the second pressure sensing electrode 32 are spaced apart from each other.

For example, when a touch event occurs, the distance between the first pressure sensing electrode 31 and the second pressure sensing electrode 32 is changed corresponding to the touch pressure, and therefore, the capacitance cap may be changed.

Accordingly, when a touch event occurs, a variation of the capacitance cap is detected, so that a magnitude of the touch pressure, which corresponds to the variation of the capacitance cap, can be recognized.

The first pressure sensing electrode 31 is a conductive layer or at least one conductive pattern, which is located on the other surface BF opposite to the one surface FF of the encapsulation substrate 12. For example, the first pressure sensing electrode 31 is disposed on one surface of the pixel array substrate 11. The first pressure sensing electrode 31 corresponds to one electrode of the capacitor for forming the capacitance cap.

In an embodiment, the first pressure sensing electrode 31 may be directly formed on a rear surface of the pixel array substrate 11. Also, the first pressure sensing electrode 31 may be formed through a screen printing using a silver paste. Accordingly, the first pressure sensing electrode 31 can be formed as a thin film. The first pressure sensing electrode 31 may be provided in the shape of a quadrangular plate, but have various sizes and shapes.

The second pressure sensing electrode 32 is a conductive layer or at least one conductive pattern, which is located to be spaced apart from the first pressure sensing electrode 31. The second pressure sensing electrode 32 corresponds to the other electrode of the capacitor for forming the capacitance cap. The second pressure sensing electrode 32 may be electrically grounded.

In an embodiment, the second pressure sensing electrode 32 may be a bracket, for example, a bottom chassis. That is, the second pressure sensing electrode 32 may be a portion of the bottom chassis, and the portion of the bottom chassis may be used as the other electrode of the capacitor. Also, the second pressure sensing electrode 32 may be made of a material identical to or different from that of the first pressure sensing electrode 31.

In another embodiment, the second pressure sensing electrode 32 may exists as a component separate from the bottom chassis. In this case, the second pressure sensing electrode 32 may be located on the bottom chassis.

The second pressure sensing electrode 32 may have a planar shape capable of overlapping with the whole or a portion of the first pressure sensing electrode 31. Each of the first pressure sensing electrode 31 and the second pressure sensing electrode 32 may be provided in a single layer or a multi-layer.

The first pressure sensing electrode 31 and the second pressure sensing electrode 32 may include a conductive material. In an embodiment of the present disclosure, the conductive material may include metals or any alloy thereof. The metals may be gold (Au), silver (Ag), aluminum (Al), molybdenum (Mo), chromium (Cr), titanium (Ti), nickel (Ni), neodymium (Nd), copper (Cu), platinum (Pt), and the like.

Meanwhile, the first pressure sensing electrode 31 and the second pressure sensing electrode 32 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like.

Meanwhile, in this embodiment, an air gap structure in which no insulating layer exists between the first pressure sensing electrode 31 and the second pressure sensing electrode 32 is illustrated as an example. However, in another embodiment, an elastic member may be provided between the first pressure sensing electrode 31 and the second pressure sensing electrode 32.

The elastic member may perform a function of reducing an external impact. To this end, the elastic member may have an elastic force. For example, the elastic member may have elasticity where the elastic member is deformed by a pressure from the outside, and can be returned to the original state when the pressure from the outside is removed. Also, the elastic member may have an insulation property so as to prevent an electrical short circuit between the first pressure sensing electrode 31 and the second pressure sensing electrode 32.

The protective layer 40 is provided on the first pressure sensing electrode 31, and includes a first opening area OA1 exposing a portion of the first pressure sensing electrode 31 therethrough. The protective layer 40 performs a function of protecting the first pressure sensing electrode 31, and has the first opening area OA1 through which the first pressure sensing electrode 31 can be connected to other components, for example, the flexible circuit board 50. The size, position, and shape of the first opening area OA1 correspond to those of the conductive member 60, and may have various embodiments.

The protective layer 40 may be provided in the form of a film or foam using synthetic resin. For example, the protective layer 40 may include thermoplastic elastomer, polystyrene, polyolefin, polyurethane thermoplastic elastomer, polyamide, synthetic rubber, polydimethylsiloxane, polybutadiene, polyisobutylene, poly(styrene-butadiene-styrene, polyurethane, polychloroprene, polyethylene, silicon, etc., and combinations thereof. However, the present disclosure is not limited thereto.

The flexible circuit board 50 is a component for electrically connecting the touch sensor 20 and the first pressure sensing electrode 31 to each other. The flexible circuit board 50 is made of an entirely or partially flexible material. The flexible circuit board 50 is bent along one side of the display panel 10 to electrically connect the touch sensor 20 located at a front surface of the display panel 10 and the first pressure sensing electrode 31 located at a rear surface of the display panel 10.

One end portion of the flexible circuit board 50 is connected to the touch sensor 20, and the other end portion of the flexible circuit board 50 is electrically connected to the first pressure sensing electrode 31 through the conductive member 60. The touch controller 70 electrically connected to the touch sensor 20 and the first pressure sensing electrode 31 may be located on the flexible circuit board 50.

Specifically, the flexible circuit board 50 has a structure in which a conductive layer 53 is located between a first protective layer 51 and a second protective layer 52. The first protective layer 51 and the second protective layer 52 include an insulating material, and the conductive layer 53 includes a conductive material such as metal.

One end portion of the conductive layer 53 is attached to the pad (not shown) of the connection line 23 of the touch sensor 20, and the other end portion of the conductive layer 53 is attached to the conductive member 60. At this time, the other end portion of the flexible circuit board 50, which corresponds to the first opening area OA1, has a second opening area OA2 formed by removing a portion of the second protective layer 52 to expose a portion of the conductive layer 53 therethrough. Here, the second opening area OA2 may have a size corresponding to that of the first opening area OA1. When the flexible circuit board 50 is bent, the first opening area OA1 and the second opening area OA2 are to be aligned to overlap with each other.

Additionally, an adhesive member (not shown) having an appropriate size is provided between the flexible circuit board 50 and the touch sensor 20 and between the flexible circuit board 50 and the protective layer 40, thereby ensuring adhesion.

The conductive member 60 is a component that is located in the first opening area OA1 of the protective layer 40 and electrically connects the first pressure sensing electrode 31 and the flexible circuit board 50 to each other. The conductive member 60 may be formed of an adhesive material having conductivity.

In an embodiment, as shown in FIG. 1C, the conductive member 60 may have a structure in which a conductive fabric 63 is located between a first conductive adhesive layer 61 and a second conductive adhesive layer 62. Each of the first conductive adhesive layer 61 and the second conductive adhesive layer 62 may have a structure in which metal conductive balls 65 are mixed in an acryl-based polymer adhesive such that current can flow therethrough. The metal conductive balls 65 may include at least one of nickel and copper. The conductive fabric 63 may include at least one of nickel and copper such that current can flow through a fiber material such as cotton.

The size, position, and shape of the conductive member 60 may have various embodiments. However, a thickness of the conductive member 60 may be thicker than that of the protective layer 40 such that the conductive member 60 is easily adhered to the conductive layer 53 of the flexible circuit board 50.

The touch controller 70 calculates a magnitude of a touch pressure by sensing an electrical characteristic value of the first pressure sensing electrode 31. The touch controller 70 senses a variation of the capacitance cap between the first pressure sensing electrode 31 and the second pressure sensing electrode 32, so that the magnitude of the applied touch pressure can be detected.

To this end, the touch controller 70 is electrically connected to the first pressure sensing electrode 31. In an embodiment, when the second pressure sensing electrode 32 is grounded, an output signal from the second pressure sensing electrode 32 is always constant, and thus the connection of the touch controller 70 to the second pressure sensing electrode 31 is not required. In this case, the touch controller 70 may determine the variation of the capacitance cap, based on only the output signal from the first pressure sensing electrode 31.

In another embodiment, the touch controller 70 may be simultaneously connected to the first pressure sensing electrode 31 and the second pressure sensing electrode 32 to determine the variation of the capacitance cap.

Meanwhile, the touch controller 70 may determine a touch position, based on a sensing signal from the touch sensor 20. To this end, the touch controller 70 is electrically connected to the first and second sensing electrodes 21 and 22.

For example, if a contact object such as a finger of a user or a touch pen is in contact with the apparatus, a change in mutual capacitance corresponding to a contact position is transmitted from the first sensing electrodes 21 and the second sensing electrode 22 to the touch controller 70 via the connection line 23. Then, the touch controller 70 may detect a touch position corresponding to a touch input by converting an electrical signal corresponding to the change in mutual capacitance into digital data.

In an embodiment, the touch controller 70 may be located in one area of the flexible circuit board 50.

Meanwhile, although not shown in the drawings, the apparatus may further include a main flexible circuit board (not shown) that is connected the pixel array substrate 11 of the display panel 10 and has a display driving circuit mounted thereon. Like the flexible circuit board 50, the main flexible circuit board may be bent along one side of the display panel 10 to be folded at the rear surface of the display panel 10, and be electrically connected to the flexible circuit board 50.

Figure 2:
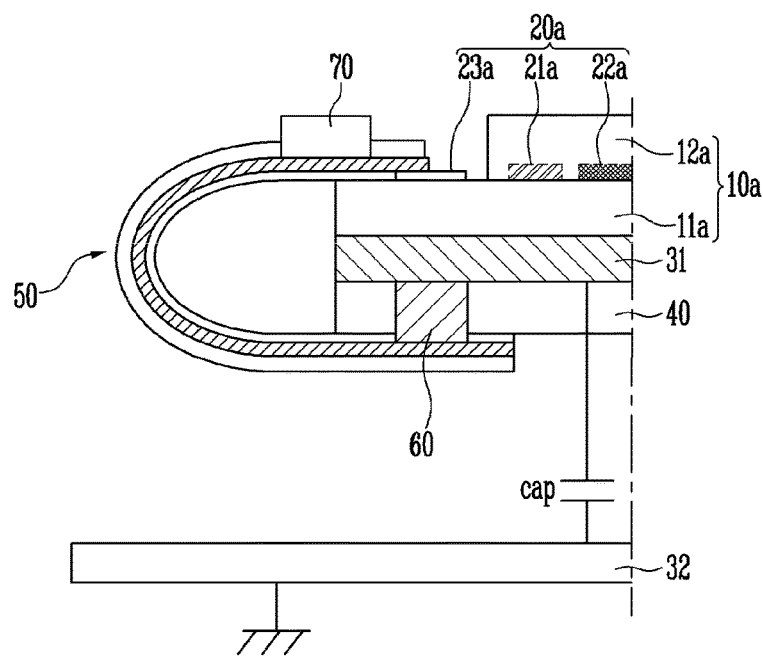
FIG. 2 is a partial sectional view of an apparatus for sensing a touch pressure according to another embodiment of the present disclosure.

FIG. 2 is a partial sectional view of an apparatus for sensing a touch pressure according to another embodiment of the present disclosure.

Components having the same reference numerals as those described above may refer to the aforementioned disclosure, and overlapping description will be omitted.

Referring to FIG. 2, in the apparatus according to this embodiment, a touch sensor 20a is formed between an encapsulation substrate 12a and a pixel array substrate 11a of a display panel 10a. Specifically, the display panel 10a may include the pixel array substrate 11a on which a plurality of pixels (not shown) are formed and the encapsulation substrate 12a covering the pixel array substrate 11a. The touch sensor 20a may include first sensing electrodes 21a, second sensing electrodes 22a, and connection lines 23a. At least one of the first sensing electrodes 21a, the second sensing electrodes 22a, and the connection line 23a may be formed on the pixel array substrate 11a. Selectively, at least one of the second sensing electrodes 22a and the connection line 23a may be formed on the encapsulation substrate 12a.

Meanwhile, a driving circuit (not shown) for driving the display panel 10a may be mounted on the flexible circuit board 50.

Figure 3:
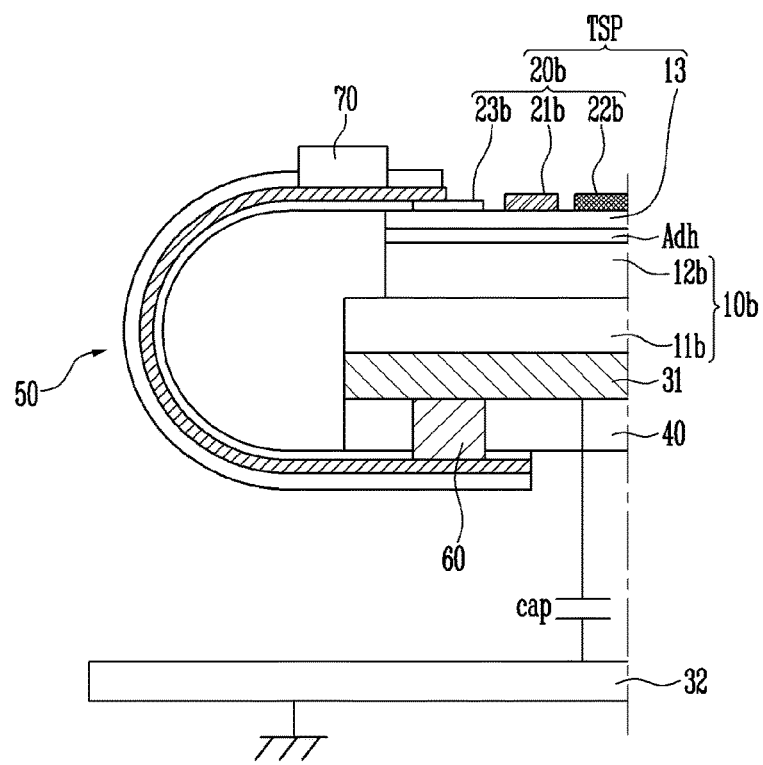
FIG. 3 is a partial sectional view of an apparatus for sensing a touch pressure according to still another embodiment of the present disclosure.

FIG. 3 is a partial sectional view of an apparatus for sensing a touch pressure according to still another embodiment of the present disclosure.

Components having the same reference numerals as those described above may refer to the aforementioned disclosure, and overlapping description will be omitted.

Referring to FIG. 3, in the apparatus according to this embodiment, the display panel 10b includes a pixel array substrate 11b on which a plurality of pixels (not shown) are formed and an encapsulation substrate 12b covering the pixel array substrate 11b. The display panel 10b may be a flexible display panel having flexibility entirely or partially. In an embodiment, the display panel 10b may be an organic light emitting display panel, and various examples known in the art may be applied as the display panel 10b. A touch sensor 20b is directly formed on a base substrate 13 of a touch screen panel TSP. The touch screen panel TSP may include the base substrate 13 and the touch sensor 20b. The touch sensor 20b may include first sensing electrodes 21b, second sensing electrodes 22b, and connection lines 23b. The touch screen panel TSP may be located on a display panel 10b, and an adhesive member Adh may be provided between the touch screen panel TSP and the display panel 10b.

The base substrate 13 may be made of an insulative material such as glass or resin. Also, the base substrate 13 may be made of a material having flexibility to be bendable or foldable, and have a single-layer structure or a multi-layer structure.

For example, the base substrate 13 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

As described above, according to the present disclosure, a pressure sensing electrode is formed on a substrate through a printing technique, and the pressure sensing electrode and a flexible circuit board are electrically connected to each other using a conductive member located in an opening area of a protective layer, so that it is possible to provide an apparatus for sensing a touch pressure, which has reduced cost and decreased thickness, as compared with the related art.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An apparatus for sensing a touch pressure, the apparatus comprising:
   a substrate;
   a touch sensor provided on one surface of the substrate;
   a first pressure sensing electrode provided on the other surface opposite to the one surface of the substrate;
   a protective layer provided on the first pressure sensing electrode, the protective layer including a first opening area through which a portion of the first pressure sensing electrode is exposed;
   a flexible circuit board electrically connecting the touch sensor and the first pressure sensing electrode to each other; and
   a conductive member disposed in the first opening area, the conductive member electrically connecting the first pressure sensing electrode and the flexible circuit board to each other.

2. The apparatus of claim 1, wherein the conductive member comprising:
   a first conductive adhesive layer:
   a second conductive adhesive layer; and
   a conductive fabric disposed between the first conductive adhesive layer and the second conductive adhesive layer.

3. The apparatus of claim 2, wherein each of the first conductive adhesive layer and the second conductive adhesive layer comprising:
   metal conductive balls mixed in a polymer adhesive.

4. The apparatus of claim 1, wherein a thickness of the conductive member is thicker than that of the protective layer.

5. The apparatus of claim 1, wherein the first pressure sensing electrode is formed through a screen printing technique using a silver paste.

6. The apparatus of claim 1, further comprising a second pressure sensing electrode disposed to be spaced apart from the first pressure sensing electrode, the second pressure sensing electrode forming a capacitance with the first pressure sensing electrode.

7. The apparatus of claim 6, wherein the second pressure sensing electrode is grounded.

8. The apparatus of claim 6, wherein the second pressure sensing electrode is a bottom chassis.

9. The apparatus of claim 1, further comprising a touch controller calculating a magnitude of a touch pressure by sensing an electrical characteristic value of the first pressure sensing electrode.

10. The apparatus of claim 1, wherein the substrate is an encapsulation substrate of a display panel, and
wherein the touch sensor is directly formed on the encapsulation substrate.

11. The apparatus of claim 1, wherein the substrate is a pixel array substrate of a display panel,
wherein the touch sensor is formed between an encapsulation substrate and the pixel array substrate of the display panel.

12. The apparatus of claim 1, wherein the substrate is a base substrate of a touch screen panel.

13. The apparatus of claim 1, wherein the touch sensor includes a plurality of sensing electrodes for sensing a touch position.

14. The apparatus of claim 1, wherein one end portion of the flexible circuit board is electrically connected to the touch sensor, and the other end portion of the flexible circuit board is electrically connected to the first pressure sensing electrode through the conductive member.

15. The apparatus of claim 14, wherein the flexible circuit board includes a first protective layer, a second protective layer, and a conductive layer provided between the first protective layer and the second protective layer, and
wherein the other end portion of the flexible circuit board, which corresponds to the first opening area, has a second opening area formed by removing a portion of the first protective layer or the second protective layer to expose a portion of the conductive layer therethrough.

16. A display device for sensing a touch pressure, the display device comprising:
a display panel including a pixel array substrate;
a touch sensor disposed on one surface of the display panel;
a first pressure sensing electrode provided on the other surface opposite to the one surface of the display panel;
a protective layer provided on the first pressure sensing electrode, the protective layer including a contact hole through which a portion of the first pressure sensing electrode is exposed;
a flexible circuit board electrically connecting the touch sensor and the first pressure sensing electrode; and
a conductive member disposed in the contact hole, the conductive member electrically connecting the first pressure sensing electrode and the flexible circuit board.

17. The display device of claim 16, wherein the conductive member includes a first conductive adhesive layer, a second conductive adhesive layer and a conductive member disposed between the first conductive adhesive layer and the second conductive adhesive layer.

18. The display device of claim 17, wherein a thickness of the conductive member is thicker than that of the protective layer.

19. The display device of claim 18, wherein the first conductive adhesive layer and the second conductive adhesive layer include metal conductive balls mixed in a polymer adhesive.

20. The display device of claim 19, wherein the conductive member includes a conductive fabric.

* * * * *